US008023915B2

(12) United States Patent
Orlik et al.

(10) Patent No.: US 8,023,915 B2
(45) Date of Patent: Sep. 20, 2011

(54) BEAMFORMING IN WIRELESS VEHICULAR NETWORKS

(75) Inventors: Philip V. Orlik, Cambridge, MA (US); Raymond Yim, Cambridge, MA (US); Ramesh Annavajjala, Quincy, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 411 days.

(21) Appl. No.: 12/413,868

(22) Filed: Mar. 30, 2009

(65) Prior Publication Data
US 2010/0248672 A1 Sep. 30, 2010

(51) Int. Cl.
H04B 1/06 (2006.01)
H04B 7/00 (2006.01)
(52) U.S. Cl. .................... 455/277.2; 455/277.1
(58) Field of Classification Search ............... 455/277.1, 455/277.2; 343/725, 742, 777
See application file for complete search history.

(56) References Cited

U.S. PATENT DOCUMENTS

| 2010/0188304 | A1* | 7/2010 | Clymer et al. ............ 343/753 |
| 2010/0248672 | A1* | 9/2010 | Orlik et al. ............ 455/277.2 |
| 2011/0014878 | A1* | 1/2011 | Choudhury et al. ........... 455/73 |
| 2011/0030015 | A1* | 2/2011 | King et al. .................. 725/68 |

FOREIGN PATENT DOCUMENTS
JP 2010239607 A * 10/2010

OTHER PUBLICATIONS

Godara et "Applications of Antenna Arrays to Mobile Communications, Part I: Performance Improvement, Feasibility, and System Considerations", Proceedings of the IEEE, vol. 85, No. 7, pp. 1031-1060, 1997.

* cited by examiner

Primary Examiner — Lincoln Donovan
Assistant Examiner — Adam Houston
(74) Attorney, Agent, or Firm — Dirk Brinkman; Gene Vinokur

(57) ABSTRACT

Beams are used to communicate in a wireless network including mobile and stationary receivers. The network operates according to the IEEE 802.11p in wireless access to vehicular environments (WAVE). A direction from the mobile transceiver to the stationary receiver is predicted using geographic information available to the mobile transceiver. A set of signals are received in the mobile transceiver from the stationary transceiver, wherein the signals are received by an array of antennas, and wherein the signals are received using a set of beams, and wherein each beam is approximately directed at the stationary receiver. A signal-to-noise ratio (SNR) is measured for each beam, and the beam with an optimal SNR is selected as an optimal beam for communicating data between the mobile transceiver and the stationary transceiver.

18 Claims, 7 Drawing Sheets

BEAMFORMING IN WIRELESS VEHICULAR NETWORKS

FIELD OF THE INVENTION

This invention relates generally to beam forming in a wireless network, and more particularly to beam forming in a vehicular network

BACKGROUND OF THE INVENTION

Vehicular Communications and the WAVE Standard

The IEEE 802.11p specifies wireless access to vehicular environments (WAVE). This standard supports intelligent transportation systems (ITS). The current standard specifies transceivers with a single antenna, and orthogonal frequency-division multiplexing (OFDM) for the modulation technique at the physical layer (PHY). WAVE transceivers include mobile transceiver in vehicles, and stationary road side units (RSUS). The WAVE network can also be used in other mobile environments, such as railways, and water ways.

Multi-Antennas

Generally, multiple antennas transceivers improve throughput and reliability. A number of wireless standards specify OFDM and multiple nput multiple output (MIMO) technologies. These include IEEE 802.16, IEEE 802.11n, and 3GPP LTE (long term evolution).

However, MIMO requires accurate channel state information (CSI), and complex digital processing at the receiver. Providing CSI to the transmitter can require large overhead due to time varying nature of the channel caused by the fast velocity of WAVE transceivers.

Beam forming improves the reliability of focusing an array pattern in a directed beam. That is, the antenna array has a spatially dependent gain that amplifies signals based on there angle of arrival, see Godara "Applications of Antenna Arrays to Mobile Communications, Part I: Performance Improvement, Feasibility, and System Considerations", Proceedings of the IEEE, Vol. 85, No. 7, pp. 1031-1060, 1997.

The goal of the invention is to improve reliability in WAVE networks using multiple antennas.

SUMMARY OF THE INVENTION

Beams are used to communicate in a wireless network including mobile and stationary receivers. The network operates according to the IEEE 802.11p in wireless access to vehicular environments (WAVE).

A direction from the mobile transceiver to the stationary receiver is predicted using geographic information available to the mobile transceiver. A set of signals are received in the mobile transceiver from the stationary transceiver, wherein the signals are received by an array of antennas, and wherein the signals are received using a set of beams, and wherein each beam is approximately directed at the stationary receiver.

A signal-to-noise ratio (SNR) is measured for each beam, and the beam with an optimal SNR is selected as an optimal beam for communicating data between the mobile transceiver and the stationary transceiver.

DETAILED DESCRIPTION OF THE PREFERRED EMBODIMENTS

Figure 1:
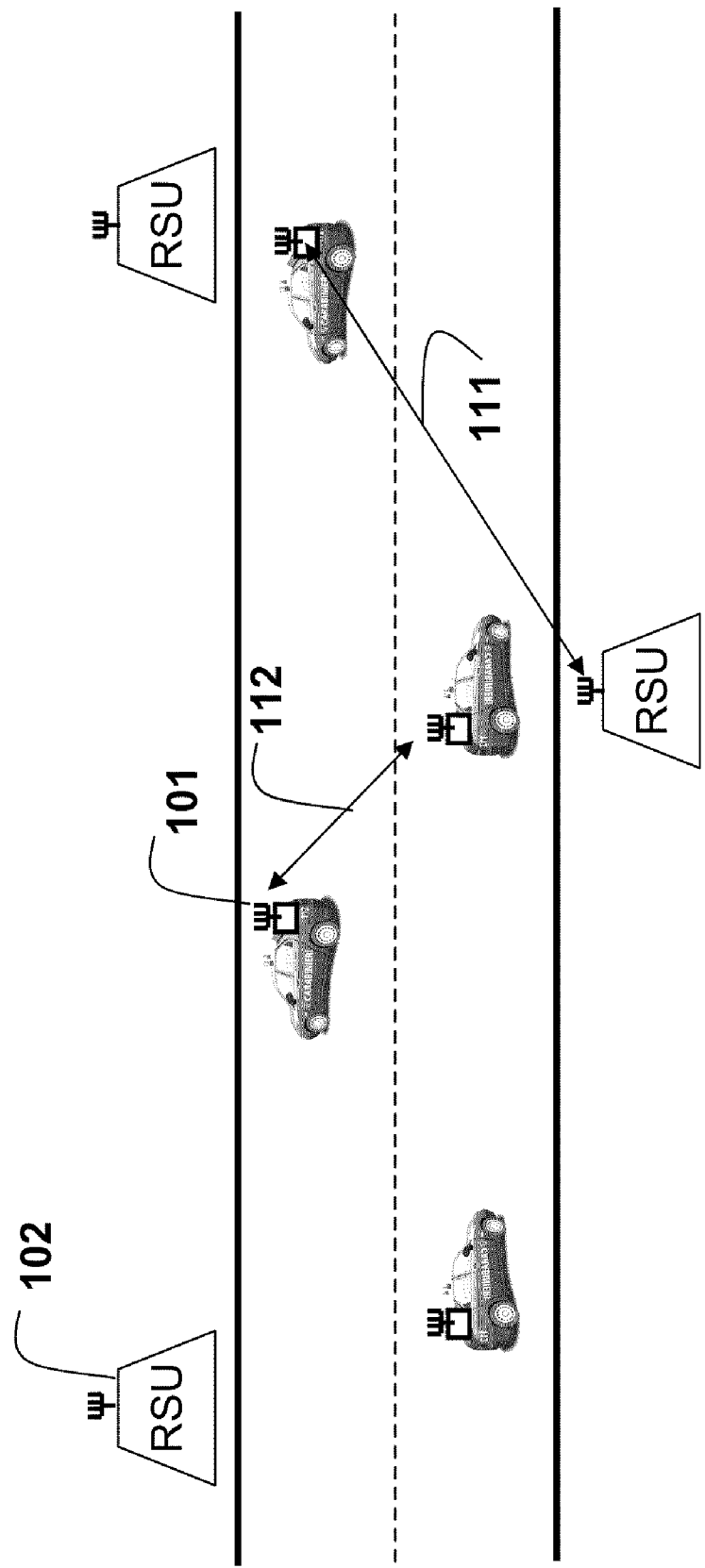
FIG. 1 is a schematic of a WAVE network according to embodiment of the invention.

FIG. 1 shows a network that uses embodiments of our invention. The network uses orthogonal frequency-division multiplexing (OFDM) and provides wireless access in vehicular environments (WAVE). The network includes a set of mobile transceivers 101 and a set of stationary road side units (RSUS) 102. The mobile transceivers are mounted in vehicles, and are connected to an array of antennas 201. The communication 111 between the RSUS and the vehicle is called vehicle to infrastructure (V2I), and the communication 112 between vehicles is called vehicle to vehicle (V2V).

Figure 2:
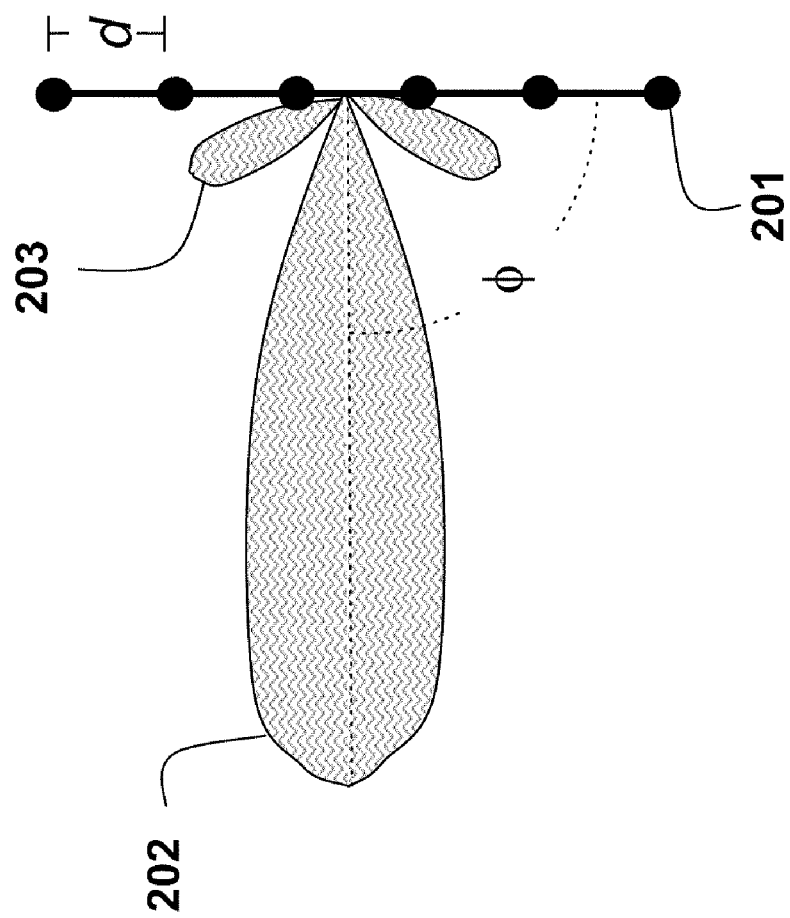
FIG. 2 is a schematic of an antenna array and beams according to embodiments of the invention.

FIG. 2 shows an array of antennas 201, and a beam pattern at a transmitter that includes a main beam (lobe) 202 with a highest gain at an angle $\phi$ orthogonal with respect the array, and side beams 203 with much lower gains. Beams can also be formed at the receiver the signals received by the different antennas. It is understood that other antenna design are possible to provide different beam patterns. The collinear array of antennas is preferably mounted vertically to increase overall gain and directivity in the horizontal direction.

Figure 3:
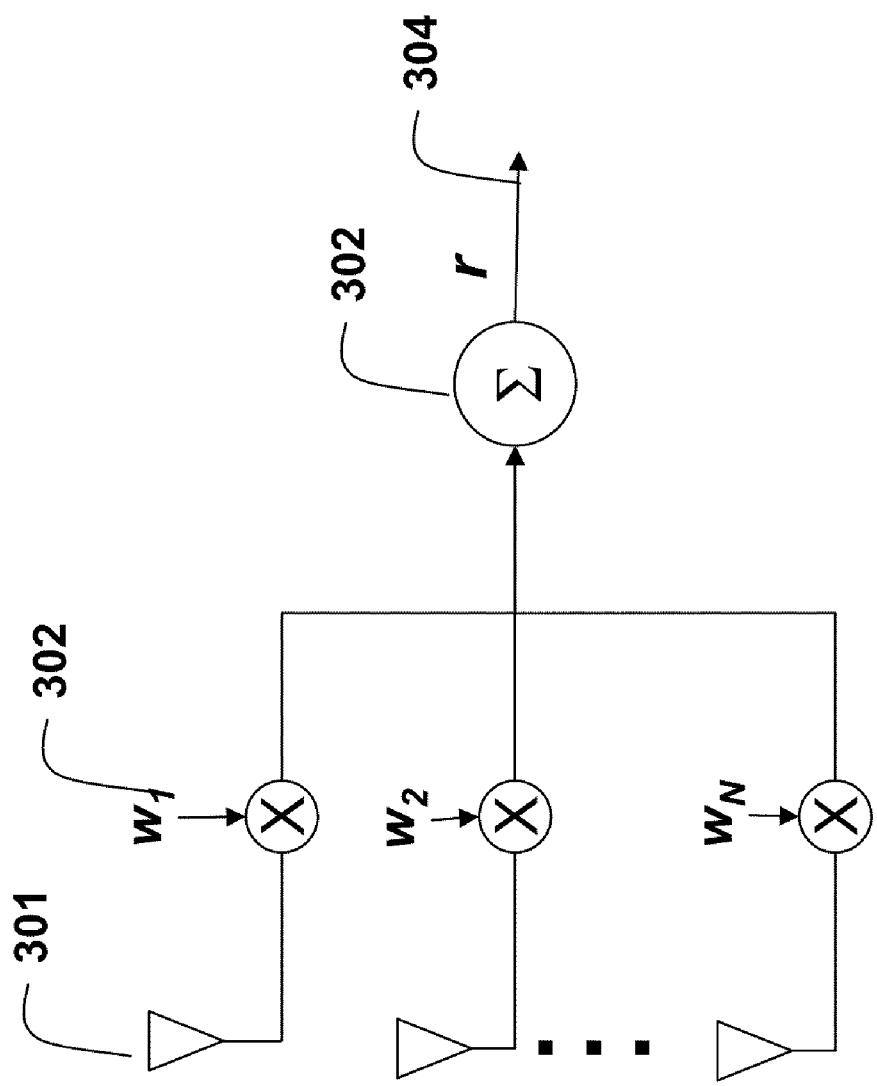
FIG. 3 is a block diagram of a receiver according to embodiments of the invention.

As shown in FIG. 3, each transmitted signal received at each antennas 301 is weighted 302. The weighted signals are summed 303 to determine a combined received signal r 304

$$r = \sum_{n=1}^{N} w_n^* s_n = w^H s, \quad (1)$$

where N is the number of antenna, $w_n$, is the weight applied to the signal $s_n$, received by the $n^{th}$ antenna, $w=[w_1, w_2, \ldots, w_N]^T$, $s=[s_1, s_2, \ldots, s_N]^T$, T is the transpose operator, and H is the Hermitian operator.

A weight vector $w^H$ for the received (or transmitted) signals is a function of a geometry the array of antennas. If the array is linear and uniform as shown in the FIGS. 1-3, then the weights are $$w_n = \exp(jnkd \cos \phi), \quad (2)$$

where j is the complex number $\sqrt{-1}$, n is the number of antennas, k is the wavenumber, and d is the distance between the antennas. Generally, $w=\{w_{\phi_1}, w_{\phi_2}, \ldots, w_{\phi_K}\}$, where the subscripts indicate the direction and pattern of the beam.

Eqn. (2) applies to a uniform collinear array antenna as shown in FIG. 2. It is understood the geometry and orientation of the array may vary for different vehicles, depending on body design, wiring cost, and aerodynamics. Thus, the exact vector of weights to produce a beam in a particular angular direction may not follow Eqn. 2. However, a characterization of the beam pattern for a particular antenna can be determined when the antenna array is designed, and the sets of weight vectors $w=\{w_{\phi_1}, w_{\phi_2}, \ldots w_{\phi_K}\}$ for possible beams, can be stored in the transceiver. There is one vector for each beam pattern and direction. Thus, the transceiver easily select possible beam patterns and directions when traveling.

For example, the vector $\{w_0, w_{90}, w_{180}, w_{270}\}$ represents the weights for beams at angles of $\{0, 90, 180, 270\}$ degrees. The width of the beam is inversely proportional to the number of antenna elements. Optimally, an eigen beamformer adaptively adjusts the weights in accordance to the observed channel, and selects weights that direct energy into the optimal eigen channel.

However, in a mobile environment, this requires accurate and frequent channel estimates at the receiver, which must be fed back to the transmitter. If the vehicles travel at high speed, the coherence time of the channel is short, and the overhead for the feedback becomes impractical.

GPS Assisted Beam Selection

Figure 4:
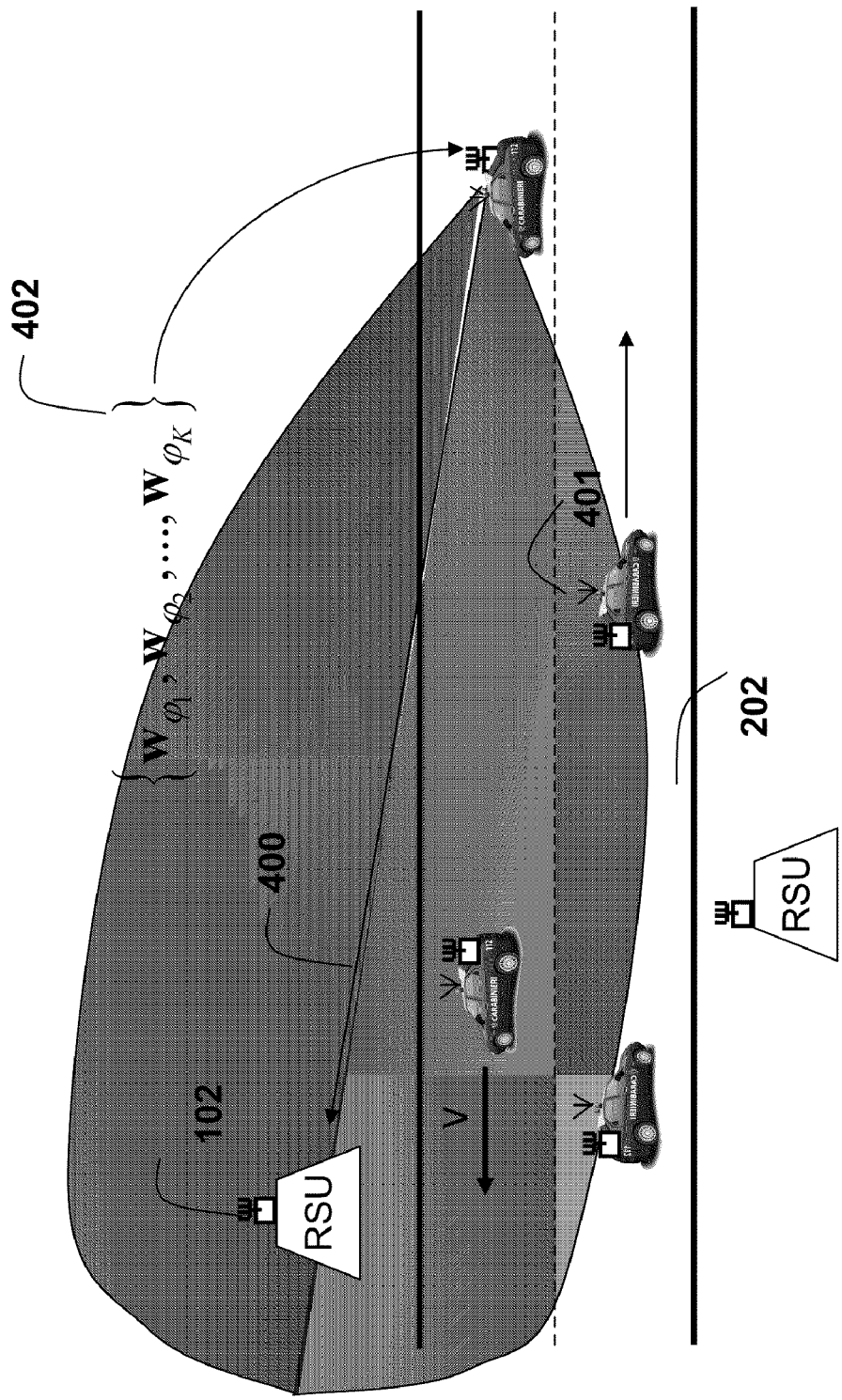
FIG. 4 is a schematic of a WAVE environment and a weight vector according to embodiments of the invention.

As shown in FIG. 4, the vehicles can include Global positioning Systems (GPS) 401. The GPS has information pertaining to the geographical location of the vehicle, and the direction and speed of travel. The information can be used to determine the appropriate weight vector 402. When the transceivers in the vehicles 101 communicate 111 with the RSUs 102, the main beam 202 should initially be aligned with the approximate direction 400 to the RSUs. The initial beam can also be relatively wide. The direction and width of the beam can be adjusted as the location of the RSU becomes known.

The pointing in the direction 400 of the RSU refers to only the initial search when the transceiver in the vehicle does not known the optimal beam direction. The performance can be improved dramatically when the vehicle refines the beam direction. Therefore, we describe how to determine the optimal beam, at any point in time.

Specifically, if v is the velocity vector of the vehicle as determined by the GPS, then the angular direction is $$\phi_d = \tan^{-1}\left(\frac{y}{x}\right)$$

where (x, y) are the north-south and east-west components of the velocity vector, respectively. Two cases can be considered. If the GPS has data pertaining to the geographical location of RSUs, then the beam can be directed 400 approximately toward the nearest RSU, see FIG. 4. Otherwise, if the location of the RSUs is unknown, then the beam can be directly along the direction of travel.

This direction ensures that RSUs are detected as the vehicle approaches, and also provides the capability to find the RSUs that are located along the road, on nearby buildings, overhead signage, and the like. With a substantially wide beam, directing the beam forward is likely to cover a RSU. However, but the performance degrades dramatically if the beam is not directly at the RSU. The problem performance is even worse with narrow beams.

The weight vector with an index nearest to $\phi_d$ is selected from $w_{\phi_1}, w_{\phi_2}, \ldots, w_{\phi_K}$ 402 if communication with the RSU 102 is desired.

Alternatively, because the placement of the RSUs along the road will vary geographically, the receiver can search the possible prestored beams, and use the beam with the optimal signal-to-noise ratio (SNR) communicate data. In this case, it is reasonable to limit this search to beams over a small range of angular directions.

If the communications 112 are with other vehicles, then the weight vector with index closest to $\phi_d$ or $\phi_d \pm 180$ is selected so that the main beam is along the direction of travel.

Determining when to Switch Beams

As the vehicle travels, it will come into range of other RSUs. The GPS can also indicate when the vehicle changes direction. However, in an urban environment, the GPS signal may not always be available, and beam steering becomes unreliable.

OFDM Resource Block

Figure 5:
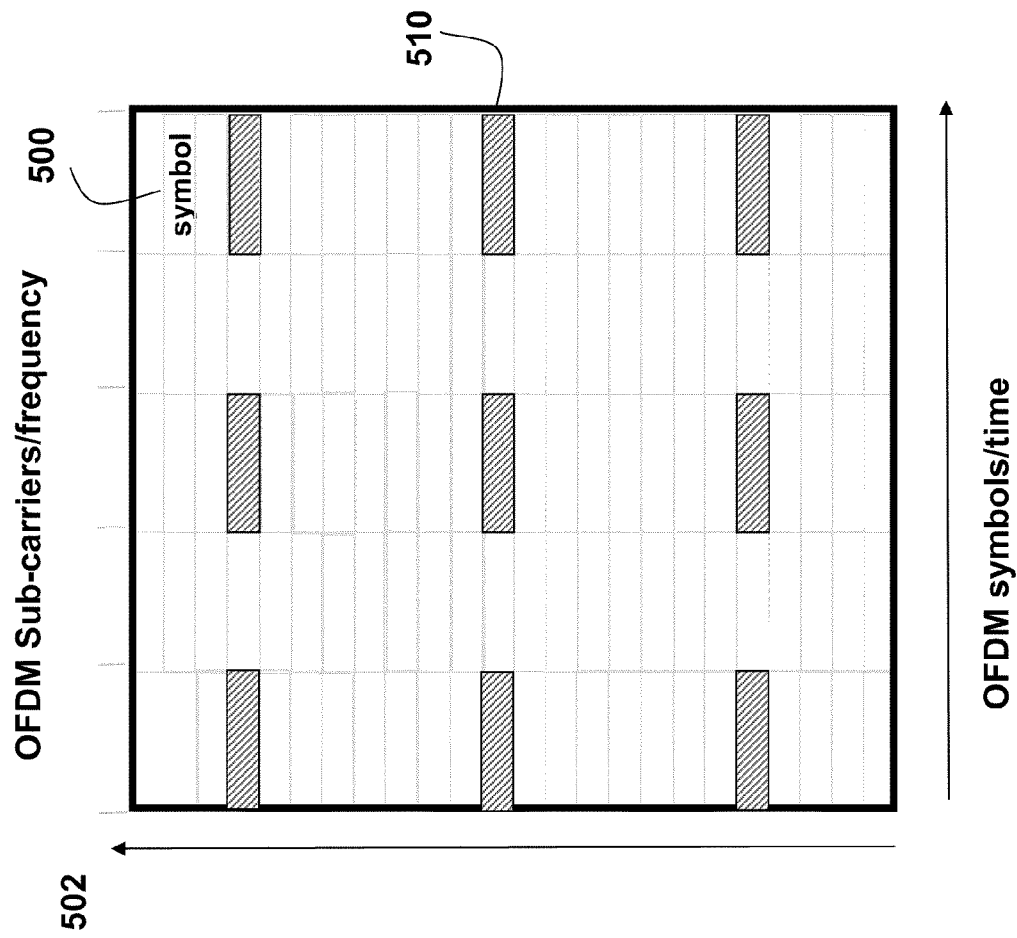
FIG. 5 is a block diagram of an OFDM resource block used by embodiments of the invention.

As shown in FIG. 5, the physical, symbols (data) 500 are transmitted sequentially in the time domain 501 using sub-carriers in the frequency domain 502. The OFDM symbols are indexed from 0 to N−1 in the time domain, and the sub-carriers are indexed from 0 to K−1.

Some sub-carriers include pilot symbols 510 for the purposes of channel estimation, and beam selection as described herein. The received signal on each pilot symbol is $$r_p(n,k) = h_{n,k} * p_{n,k} \exp(j2\pi g(n,k) * \Delta f T_s) + n_{n,k}$$

where $p_{n,k}$ is the $k^{th}$ pilot symbol located in the $n^{th}$ OFDM symbol, and $h_{n,k}$ is the channel coefficient for the $n^{th}$ OFDM symbol at sub-carrier k, $\Delta f$ is the sub-carrier spacing, $T_s$ is the OFDM symbol duration and $g(n, k)$ is a mapping of the OFDM symbol index, n, and the pilot index, k, to the physical sub-carrier index which is in the range of (0, K−1).

If the main beam is aimed directly towards a receiver, then the channel coefficients can be represented by non-zero mean complex Gaussian distributed random variables. This is true for all sub-carriers in the OFDM symbol. However, the beam is not directed at the receiver, then the channel coefficients become zero-mean Gaussian distributed.

The accuracy of the direction of the beam can be verified by determining whether an average T of the sub-channel fading coefficients are near zero or not:

$$T = \sum_{k=0}^{K-1} \frac{1}{N} \sum_{n=0}^{N-1} \frac{r_p(n,k)}{p_{n,k}} \exp(-j2\pi g(n,k) * \Delta f T_s)$$

$$= \sum_{k=0}^{K-1} \frac{1}{N} \sum_{n=1}^{N} h_{n,k} + \tilde{n},$$

where $\tilde{n}$ is the noise component, and an appropriate weight vector can be selected.

Improving Performance Using Previously Traveled Routes

Personal vehicles most frequently travel over a small set of routes between home, work, school, shops, and the like. Commercial vehicles similarly have repetitive routes between. If the arrangement of the RSUS remains relative constant, then the geography of the appropriate routes and angular directions to the RSU along the routes can be determined and stored in a memory for later use, and periodically updated. The angular directions can be sampled, interpolated and evolved while the vehicle is traveling. The directions can include a confidence score.

Determining Frequently Traveled Routes

Routes begin at a start location, and terminate at an end location, which often are the same. Routes are partitioned into segments of length L. A route can include non-overlapping and adjacent segments. A usage metric is associated with each segment in stored memory.

Figure 6:
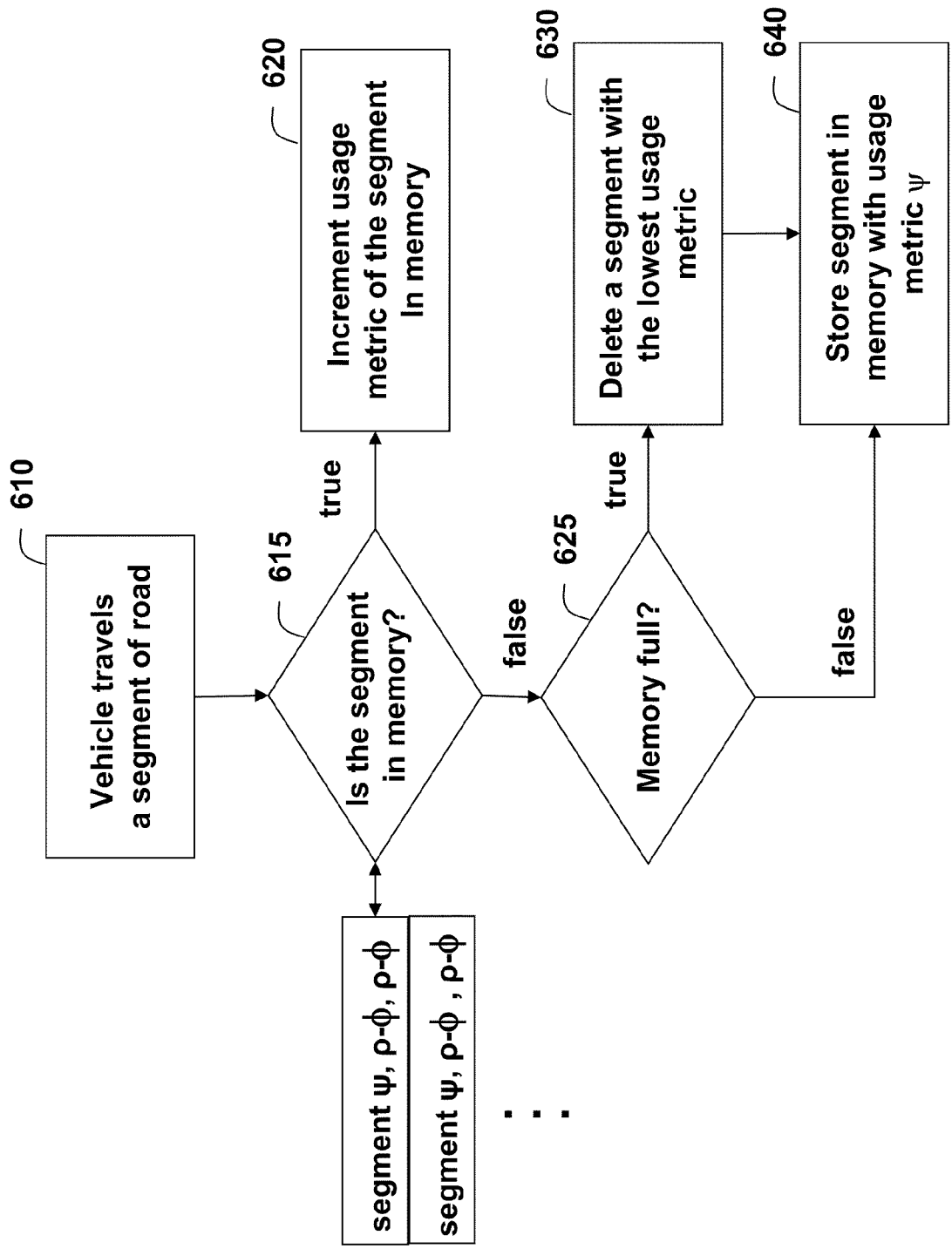
FIG. 6 is a block diagram of a method for determining frequently used routes according to embodiments of the invention.

FIG. 6 shows the method for determining the metrics ψ. When a vehicle travels 610 a segment 602 of a route 601, the method determines 615 whether the segment is stored in the memory. If true, metric is incremented 620, unless a maximum is reached.

If false, then the method determines 625 whether the memory is full 525. If true, then the segment with a smallest is deletes 630.

If the segment is not in the memory and the memory is not full, the segment is stored 640 in the memory. The usage metrics can decremented over time, so that the usage metric of less frequently traveled routes become zero, and the segments are deleted, so that only the frequently traveled segments are retained.

Storage of Angular Directions

Each segment includes sampled locations $\rho$. For each sampled location with a usage metric $\psi$ greater than a threshold, a method stores the angular direction $\phi^*$ that has the optimal SNR as $$\phi_{diff} = \phi^* - \phi_{RSU},$$

where $\phi_{RSU}$ is the angular direction from the vehicle to the RSU. If there is line of sight exists between the vehicle and the RSU, the communication channel has a small number of strong multipath components. Therefore, the two angular locations $\phi^*$ and $\phi_{RSU}$ are similar, and $\phi_{diff}$ is close to zero. The value $\phi_{diff}$ can be quantized to reduce storage. For further memory reduction, especially when the sample locations $\rho$ are near each others, the method can combine $\phi_{diff}$ of the $\rho$ sampled locations, and perform low pass filtering to obtain low pass coefficients for storage.

If the exact location of the RSU($x_R$, $y_R$) is not known, then the location can be inferred from the stored angular directions $\phi_1, \phi_2, \ldots, \phi_\rho$ and corresponding coordinates of sampled locations $(x_1, y_1), (x_2, y_2), \ldots, (x_\rho, y_\rho)$ using a least square solution for the following system of equations, $$\begin{pmatrix} \tan^{-1}\phi_1 & -1 \\ \tan^{-1}\phi_2 & -1 \\ \vdots & \vdots \\ \tan^{-1}\phi_\rho & -1 \end{pmatrix} \begin{pmatrix} x_R \\ y_R \end{pmatrix} = \begin{pmatrix} x_1\tan^{-1}\phi_1 - y_1 \\ x_2\tan^{-1}\phi_2 - y_2 \\ \vdots \\ x_\rho\tan^{-1}\phi_\rho - y_\rho \end{pmatrix},$$

of the form $Ax=b$. The least square solution can be determined from $b_{proj}$, which is a projection of the vector b onto the column space of the array A, and solving $Ax=b_{proj}$. For an improved estimates, the method can combine the angular directions to a same RSU on multiple road segments to infer the location of the RSU. The vehicle can use the above procedure to update the locations of the RSUs, which can change over time.

Updating Angular Directions

The memory vehicle stores the angular directions that lead to a good signal-to-noise ratio. However, the stored angular directions may not be optimal. In addition, the environment can change over time due to new building construction, vegetation growth and seasonal weather changes.

Figure 7:
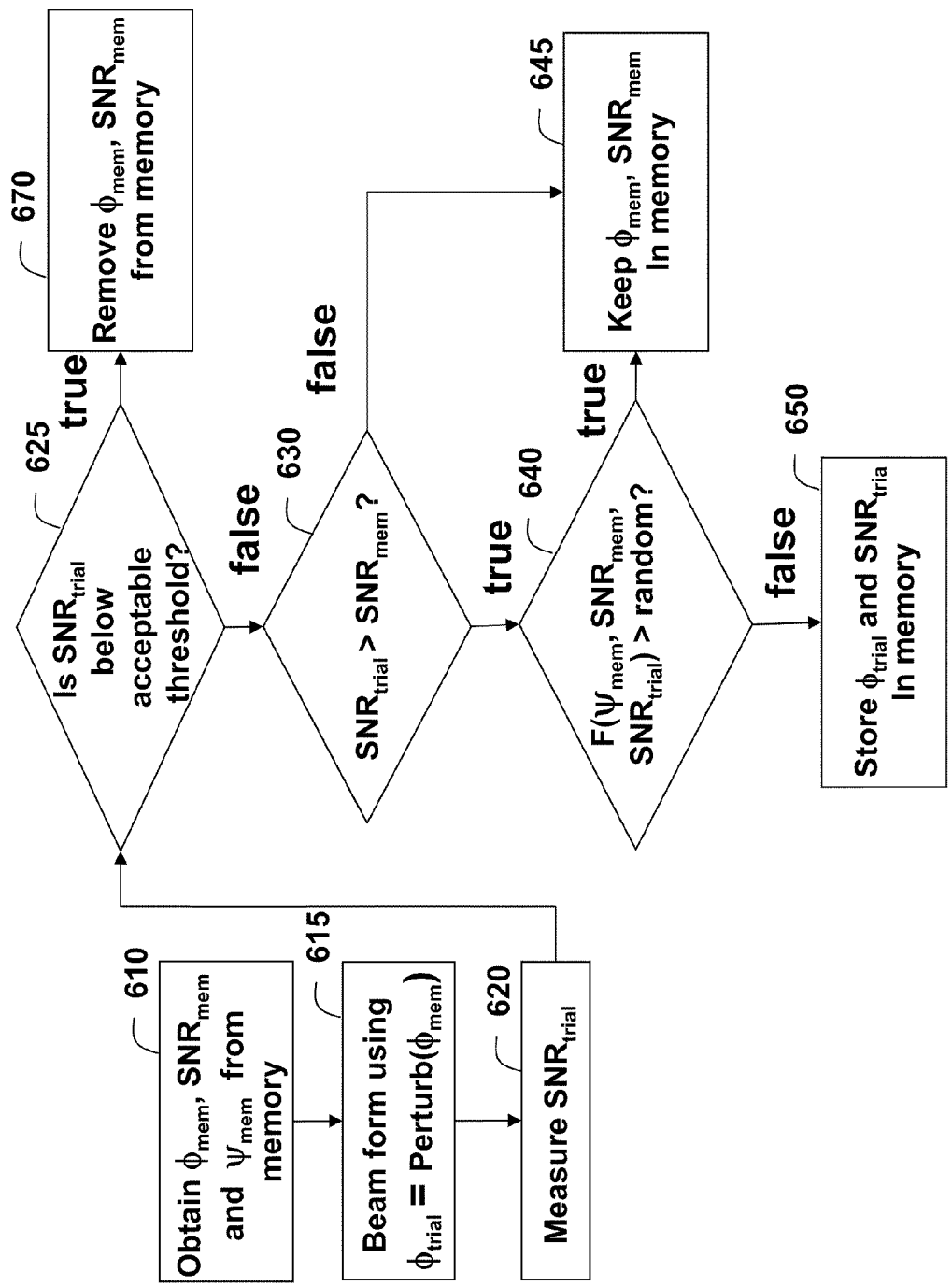
FIG. 7 is a block diagram of a method for evolving stored angular directions according to embodiments of the invention.

FIG. 7 shows a method for evolving the stored angular directions over time. When a vehicle is travelling along a segment with usage metric $\psi_{mem}$ that is larger than the threshold $\psi_1$, the method determines whether the memory stores angular directions $\phi_{mem}$ and a corresponding signal-to-noise ratio $SNR_{mem}$ at a specific location. If not, the vehicle searches for a good angular direction as described above.

If true, the method vehicle obtains 610 $\phi_{mem}$, $SNR_{mem}$ and $\psi_{mem}$ from its memory, and perturbs 615 $\phi_{mem}$ to obtain a trial angular direction $\phi_{trial}$ to be used at the specific location. The signal-to-noise ratio $SNR_{trial}$ is measured 620 when the beam is formed to the RSU using weighting coefficients corresponding to $\phi_{trial}$.

If the $SNR_{trial}$ is determined 625 to be below an acceptable threshold, then the stored angular direction may be out of date, and the $\phi_{mem}$, $SNR_{mem}$ are deleted. The method can also decrement the usage metric for this segment of the road to refresh memory.

If $SNR_{trial} > SNR_{mem}$ 630, then the trial angular direction $\phi_{trial}$ can potentially be better than $\phi_{mem}$. The method selects a random number R in a range [0 1], and compares 640 it to result of a function $F(\psi_{mem}, SNR_{mem}, SNR_{trial})$. The function has the following properties:

$0 < F(\psi_{mem}, SNR_{mem}, SNR_{trial}) < 1$;

$F(\psi_{mem}, SNR_{mem}, SNR_{trial})$ is monotonically non-decreasing w.r.t. $\psi_{mem}$;

$F(\psi_{mem}, SNR_{mem}, SNR_{trial})$ is monotonically non-decreasing w.r.t. $SNR_{mem}$; and $F(\psi_{mem}, SNR_{mem}, SNR_{trial})$ is monotonically non-increasing w.r.t. $SNR_{trial}$.

For example, consider $$F(\psi_{mem}, SNR_{mem}, SNR_{trial}) = \exp\left(-C\frac{SNR_{trial} - SNR_{mem}}{\psi_{mem}}\right),$$

where C is a constant. If $F(\psi_{mem}, SNR_{mem}, SNR_{trial})$ is less than or equal to the random number R, the new $\phi_{trial}$ and $SNR_{trial}$ are stored. If $SNR_{trial} \leq SNR_{mem}$, or if $F(\psi_{mem}, SNR_{mem}, SNR_{trial})$ is greater than the random number r, $\phi_{mem}$, $SNR_{mem}$ are retained. This process is very similar to simulated annealing where a current solution is replaced by a nearby random solution. However, in our method, the usage metric $\psi_{mem}$ decreases over time when the segment is not traveled.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for communicating beams in a wireless network, wherein the network includes a mobile transceiver and a stationary receiver, and wherein the network operates according to the IEEE 802.11p in wireless access to vehicular environments (WAVE), comprising the steps of:

predicting a direction from the mobile transceiver to the stationary receiver using geographic information available to the mobile transceiver;

receiving a set of signals in the mobile transceiver from the stationary transceiver, wherein the signals are received by an array of antennas, and wherein the signals are received using a set of beams, and wherein each beam is approximately directed at the stationary receiver;

measuring a signal-to-noise ratio (SNR) for each beam; and selecting the beam with an optimal SNR as an optimal beam for communicating data between the mobile transceiver and the stationary transceiver.

2. The method of claim 1, further comprising for each beam:

combining the signals to form a combined received signal according to $$r = \sum_{n=1}^{N} w_n^* s_n = w^H s,$$

where N is a number of antenna in the array, $w^H = [w_1, w_2, \ldots, w_N]^T$ is a vector of weight, $s = [s_1, s_2, \ldots, s_N]^T$ is a vector of the received signals, T is a transpose operator, and H is a Hermitian operator.

3. The method of claim 1, wherein the mobile transceiver is connected to a global positioning system (GPS) to acquire the geographic information, and further comprising:
storing a geographic location of the stationary receiver in the mobile transceiver;
determining a geographic location of the mobile transceiver using the GPS;
select the optimal beam according to the geographic location of the stationary transceiver and the geographic location of the mobile transceiver.

4. The method of 1, further comprising:
storing a set of weight vectors to form the set of beams.

5. The method of claim 1, wherein the set of beams are approximately directed along a direction of travel if the geographic information is not available.

6. The method of claim 1, an initial width of the set of beams is substantially wider then for the beam used for communicating the data.

7. The method of claim 2, wherein the weight vector w is $$\{w_{\phi_1}, w_{\phi_2}, \ldots, w_{\phi_K}\},$$

wherein k an index of the weight of the corresponding beam, $\phi$ is a direction of the corresponding beam, and $\phi_d$ is the direction to the stationary transceiver, and further comprising:
selecting an index nearest to $\phi_d$ for the optimal beam.

8. The method of claim 1, wherein the stationary transceiver transmits pilot symbols, and further comprising:
selecting the optimal beam based on the pilot symbols.

9. The method of claim 1, further comprising:
determining an average of sub-channel fading coefficients of the optimal beam to verify an accuracy of a direction of the optimal beam.

10. The method of claim 1, further comprising:
storing frequently traveled routes as the geographic information in the particular mobile transceiver; wherein each route has a plurality of segments, and the optimal beam is selected based on the stored routes.

11. The method of claim 10, wherein angular direction $\phi$ of the set of beams are associated with the segments.

12. The method of claim 1, wherein antennas of the stationary transceiver are omnidirectional.

13. The method of claim 2, wherein the weight vector $w^H$ is a function of a geometry the array of antennas, the array of antennas is linear and uniform, and the weights are $$w_n = \exp(jnkd \cos \phi), \qquad (3)$$

where j is the complex number $\sqrt{-1}$, n is the number of antennas, k is the wavenumber, and d is the distance between the antennas.

14. The method of claim 2, further comprising:
selecting the weights to direct energy into an optimal eigen channel.

15. The method of claim 6, wherein v is the velocity vector of the mobile transceiver, and $$\phi_d = \tan^{-1}\left(\frac{y}{x}\right)$$

where (x, y) are north-south and east-west components of the velocity vector, respectively.

16. The method of claim 10, further comprising:
updating the frequently traveled routes over time.

17. The method of claim 11, further comprising:
perturbing randomly the angular directions $\phi$ to select the optimal beam.

18. The method of claim 17, further comprising:
measuring the SNR for the perturbed angular directions to replace the stored angular direction $\phi$ when the SNR improves.

\* \* \* \* \*